United States Patent
Lai et al.

(10) Patent No.: US 12,348,085 B2
(45) Date of Patent: Jul. 1, 2025

(54) MOTOR ROTOR AND MOTOR

(71) Applicant: Huawei Digital Power Technologies Co., Ltd., Shenzhen (CN)

(72) Inventors: Bin Lai, Dongguan (CN); Hua Lan, Shanghai (CN); Mengde Li, Shanghai (CN); Zijing Wang, Shenzhen (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 260 days.

(21) Appl. No.: 18/157,712

(22) Filed: Jan. 20, 2023

(65) Prior Publication Data
US 2023/0163647 A1 May 25, 2023

Related U.S. Application Data

(63) Continuation of application No. PCT/CN2020/103671, filed on Jul. 23, 2020.

(51) Int. Cl.
*H02K 1/27* (2022.01)
*H02K 1/02* (2006.01)
(Continued)

(52) U.S. Cl.
CPC .............. *H02K 1/276* (2013.01); *H02K 1/02* (2013.01); *H02K 21/14* (2013.01)

(58) Field of Classification Search
CPC ........ H02K 1/2766; H02K 1/02; H02K 1/276; H02K 21/14; H02K 21/12
See application file for complete search history.

(56) References Cited

U.S. PATENT DOCUMENTS 4,110,718 A * 8/1978 Odor .................. H01F 1/10
310/154.26
8,421,292 B2 * 4/2013 Natsumeda .......... H02K 1/2766
310/156.43
(Continued)

FOREIGN PATENT DOCUMENTS

CN 101641854 A 2/2010
CN 102684323 A 9/2012
(Continued)

OTHER PUBLICATIONS

JP-2011216836-A machine translation Nov. 30, 2024.*

*Primary Examiner* — Leda T Pham
(74) *Attorney, Agent, or Firm* — Leydig, Voit & Mayer, Ltd.

(57) ABSTRACT

This application provides a motor rotor, including a rotor iron core and a plurality of permanent magnets disposed on the rotor iron core. Coercive forces of at least some permanent magnets are continuously gradiently distributed or gradiently distributed in a multi-stage manner from the middle to both ends along at least one direction perpendicular to a magnetization direction. The permanent magnet with a gradient coercive force design is used in the motor rotor. A coercive force of the permanent magnet is continuously gradiently distributed or gradiently distributed in a multi-stage manner from the middle to both ends. In this way, a coercive force change of the entire permanent magnet is uniform, and stability and reliability of the motor can be maximized. In addition, this can avoid excessive anti-demagnetization performance, reduce an amount of usage of heavy rare earth elements, and minimize costs of the motor.

20 Claims, 6 Drawing Sheets

(51) Int. Cl.
*H02K 1/276* (2022.01)
*H02K 21/14* (2006.01)

(56) References Cited

U.S. PATENT DOCUMENTS

| | | | |
|---|---|---|---|
| 8,638,017 B2 | 1/2014 | Miyata et al. | |
| 9,431,860 B2* | 8/2016 | Endo | H02K 1/2766 |
| 2004/0145263 A1* | 7/2004 | Kojima | H02K 1/2766 |
| | | | 310/156.56 |
| 2010/0171386 A1 | 7/2010 | Kogure et al. | |
| 2011/0068651 A1* | 3/2011 | Miyata | H02K 1/2766 |
| | | | 310/156.43 |

FOREIGN PATENT DOCUMENTS

| | | | |
|---|---|---|---|
| CN | 105375726 A | | 3/2016 |
| CN | 106451828 A | | 2/2017 |
| JP | 2011216836 A | * | 10/2011 |
| WO | 2012098737 A1 | | 7/2012 |

* cited by examiner a  b  c  d                                        e  f  g  h

MOTOR ROTOR AND MOTOR

CROSS-REFERENCE TO RELATED APPLICATIONS

This application is a continuation of International Application No. PCT/CN2020/103671, filed on Jul. 23, 2020, the disclosure of which is hereby incorporated by reference in its entirety.

TECHNICAL FIELD

This application relates to the field of permanent magnet motor technologies, and in particular, to a motor rotor and a motor.

BACKGROUND

Permanent magnet motors are widely used in aerospace, household appliances, industrial manufacturing, computers, new energy vehicles, and other fields because of their advantages such as a small volume, high efficiency, and high power density. A conventional permanent magnet synchronous motor usually includes two parts: a stator and a rotor. The rotor includes a rotor iron core and a permanent magnet mounted on the rotor iron core. The stator includes a stator iron core and a stator winding. After the motor is energized, a rotating magnetic field generated by the stator winding drives the rotor to rotate and output a torque.

The permanent magnet has a limited anti-demagnetization capability. Therefore, when an operating temperature of the motor is higher than a maximum allowed operating temperature of permanent magnet or a reverse magnetic field applied by the stator winding to the permanent magnet exceeds the anti-demagnetization capability of the permanent magnet, the permanent magnet is demagnetized, and therefore the motor fails. To prevent the permanent magnet from being demagnetized, heavy rare earth elements such as dysprosium (Dy) and terbium (Tb) usually need to be added to a neodymium iron boron permanent magnet to improve an anti-demagnetization capability of the permanent magnet. However, the heavy rare earth elements are expensive, greatly increasing costs of the motor. Therefore, a motor with both high reliability and low costs needs to be developed.

SUMMARY

Embodiments of this application provide a motor rotor and a motor. A permanent magnet with a gradient coercive force design is used in the motor rotor, so that the motor achieves excellent and stable reliability, an amount of usage of heavy rare earth elements is reduced, and costs of the motor are reduced.

Specifically, a first aspect of embodiments of this application provides a motor rotor, including a rotor iron core and a plurality of permanent magnets disposed on the rotor iron core. Coercive forces of at least some permanent magnets are continuously gradiently distributed or gradiently distributed in a multi-stage manner from the middle to both ends along at least one direction perpendicular to a magnetization direction. In this embodiment of this application, the permanent magnet with the gradient coercive force design is used in the motor rotor. The permanent magnet has both a high anti-demagnetization region for ensuring reliability of the motor and a low anti-demagnetization region for reducing content of heavy rare earth elements and minimizing costs. In addition, a coercive force is continuously gradiently distributed or gradiently distributed in a multi-stage manner from the middle to both ends. Therefore, a coercive force change of the entire permanent magnet is uniform, and a coercive force difference between a middle part and an end part can also be better increased, thereby better ensuring stability and reliability of the motor, avoiding excessive anti-demagnetization performance, and achieving low costs. To achieve a better effect, in an implementation of this application, a coercive force of each permanent magnet may be designed to be continuously gradiently distributed or gradiently distributed in a multi-stage manner from the middle to both ends along at least one direction perpendicular to a magnetization direction.

The magnetization direction of the permanent magnet is usually a direction in which a distance between two opposite surfaces of the permanent magnet is the shortest. A permanent magnet with a cuboid structure is used as an example. A magnetization direction is usually a height direction, and a direction perpendicular to the magnetization direction may be a length direction or a width direction.

In some implementations of this application, a change trend of the coercive forces of the at least some permanent magnets from the middle to both ends along the at least one direction perpendicular to the magnetization direction is as follows: continuously gradiently increasing or gradiently increasing in a multi-stage manner. In most cases, an anti-demagnetization requirement at both ends of the permanent magnet is higher than an anti-demagnetization requirement in the middle part. The coercive force is designed to gradually increase from the middle to both ends, so that the permanent magnet can have both a high anti-demagnetization region at the ends for ensuring reliability of the motor and a low anti-demagnetization region with low content of heavy rare earth elements in the middle part for reducing costs. Certainly, in some other implementations, the coercive force may be alternatively designed to gradually decrease from the middle to both ends according to an actual requirement.

In an implementation of this application, to ensure specific anti-demagnetization performance at any location on the permanent magnet, the coercive force is greater than 0 at any location along a direction in which the coercive force is gradient.

In an implementation of this application, concentrations of heavy rare earth metallic elements in the at least some permanent magnets are continuously gradiently distributed or gradiently distributed in a multi-stage manner from the middle to both ends along the direction in which the coercive force is gradient. A concentration of a heavy rare earth metallic element in a permanent magnet directly determines a magnitude of a coercive force of the permanent magnet. Along the direction in which the coercive force is gradient, a change trend of the concentration of the heavy rare earth metallic element corresponds to a change trend of the coercive force. A higher concentration of the heavy rare earth metallic element indicates a greater coercive force.

In an implementation of this application, the at least some permanent magnets are in an integrally molded structure, namely, a continuous integrated structure. In this implementation, a gradient coercive force design may be implemented by diffusing heavy rare earth metallic elements with different concentrations at different locations on a permanent magnet with an integrated structure along at least one direction perpendicular to a magnetization direction. In this implementation, a permanent magnet with an integrally molded structure and a gradient coercive force design can be prepared in one step, without bonding by using an expensive bonding agent, so that a structure is stable, and use reliability of the motor can be improved. In the permanent magnet with the integrally molded structure, along the direction in which the coercive force is gradient, a concentration of a heavy rare earth metallic element in the permanent magnet may be distributed in a manner of continuously gradiently increasing or decreasing from the middle to both ends, or may be distributed in a manner of gradiently increasing or decreasing in a multi-stage manner.

In an implementation of this application, the at least some permanent magnets are formed by splicing a plurality of sections of magnets with different coercive forces. Specifically, the permanent magnet is formed by bonding the plurality of sections of magnets with different coercive forces by using a bonding agent, or by welding the plurality of magnets. In this implementation, horizontal distribution of a coercive force of each section of magnet used for splicing is usually uniform, that is, coercive forces at any locations are usually the same. Therefore, a coercive force of the permanent magnet formed by splicing the plurality of sections of magnets is usually distributed in a manner of gradiently increasing or decreasing from the middle to both ends. Certainly, in some implementations, the coercive force may be alternatively continuously gradiently distributed from the middle to both ends.

In an implementation of this application, along the direction in which the coercive force is gradient, the at least some permanent magnets may include a center section and end sections located at both ends of the center section, and at least one transition section is further included between the center section and the end section. In some implementations of this application, the end section has a larger coercive force, so that reliability of the motor can be ensured, and the center section has a smaller coercive force and low content of heavy rare earth elements, so that costs can be minimized. In addition, a transition section is provided between a high anti-demagnetization region and a low anti-demagnetization region. The transition section is provided, so that the coercive force of the permanent magnet is distributed more uniformly and changes more uniformly. In addition, a coercive force difference between the center section and the end section can be better increased, thereby better ensuring stability and reliability of the motor, avoiding excessive anti-demagnetization performance, and achieving low costs. In this implementation, a coercive force of the end section is greater than a coercive force of the transition section, and the coercive force of the transition section is greater than a coercive force of the center section. If a coercive force of each section is a uniform value, a coercive force from the center section to the end section constitutes a multi-stage gradient. If a coercive force of each section is continuously gradient, a coercive force from the center section to the end section may also constitute a continuous gradient.

In an implementation of this application, along the direction in which the coercive force is gradient, a width of the center section is more than 30% of a total width of the permanent magnet. The center section has a small coercive force, that is, has a low concentration of heavy rare earth elements. The center section is controlled to reach a specific width ratio, thereby helping reduce an amount of usage of heavy rare earth elements in the entire permanent magnet.

In an implementation of this application, along the direction in which the coercive force is gradient, a width of the end section is less than 10% of the total width of the permanent magnet. The end section has the largest coercive force, that is, has the highest concentration of heavy rare earth elements. The end section is controlled to have a small width, thereby helping reduce an amount of usage of heavy rare earth elements.

In an implementation of this application, a minimum coercive force of the end section is more than 30% greater than a minimum coercive force of the center section. The end section requires a higher anti-demagnetization capability, and the center section requires a lower anti-demagnetization capability. The coercive force of the end section is designed to be at a higher level, so that an anti-demagnetization capability of the end section of the permanent magnet can be improved, and reliability of the motor can be removed. The coercive force of the center section is designed to be at a lower level, so that an amount of usage of rare earth can be reduced, and costs of the motor can be reduced.

In an implementation of this application, when the coercive force of the end section is continuously gradiently distributed, a difference between a maximum coercive force and the minimum coercive force of the end section is from 5% to 30%. A suitable coercive force change degree of the end section is controlled, so that both reliability of the motor and an amount of usage of heavy rare earth can be well considered.

In an implementation of this application, a difference between minimum coercive forces of the end section and an adjacent transition section is greater than 12%.

In an implementation of this application, a difference between minimum coercive forces of the center section and an adjacent transition section is from 3% to 10%.

In an implementation of this application, a coercive force gradient degree at both ends of the permanent magnet is greater than a coercive force gradient degree in the middle part. Specifically, in some implementations, a coercive force gradient degree gradually increases from the middle to both ends. Coercive forces of adjacent sections at two opposite ends, that is, on an outermost side, of the permanent magnet are designed to change faster. This can more fully meet a higher anti-demagnetization requirement at the ends of the permanent magnet of the motor, and improve reliability of the motor. Coercive forces of adjacent sections in the middle part, that is, on an inner side, of the permanent magnet are designed to change more slowly. This can meet an actual anti-demagnetization requirement while reducing redundancy of a coercive force of the permanent magnet and more effectively reducing an amount of usage of heavy rare earth elements.

In an implementation of this application, a magnetic remanence difference between two adjacent sections of the permanent magnet is less than or equal to 3%. Magnetic remanence of the permanent magnet usually has a specific fluctuation. Therefore, when the magnetic remanence difference is less than or equal to 3%, the magnetic remanence may be considered as uniform.

In an implementation of this application, one or more transition sections may be provided between the center section and the end section. When a plurality of transition sections are provided, a coercive force change from the center section to the end section is smoother. This can further reduce redundancy of a coercive force of the permanent magnet and ensure reliability of the permanent magnet while reducing an amount of usage of heavy rare earth elements.

In an implementation of this application, one transition section is included between the center section and the end section, and the permanent magnet is in a five-section structure.

In another implementation of this application, two transition sections are included between the center section and the end section, and the permanent magnet is in a seven-section structure.

In another implementation of this application, three transition sections are included between the center section and the end section, and the permanent magnet is in a nine-section structure.

In an implementation of this application, a coercive force of the permanent magnet from the middle to both ends along a width direction may be symmetrically distributed or asymmetrically distributed.

In an implementation of this application, the permanent magnet is a sintered neodymium iron boron magnet.

In an implementation of this application, the plurality of permanent magnets may be arranged on the rotor iron core in a built-in manner or a surface-mounted manner.

In some implementations of this application, the plurality of permanent magnets are arranged on the rotor iron core in a built-in manner, a plurality of magnetic steel grooves are provided on the rotor iron core, and the plurality of permanent magnets are disposed in the plurality of magnetic steel grooves in a one-to-one correspondence. The plurality of magnetic steel grooves may be provided on an axial end face of the rotor iron core at intervals along a circumferential direction of the rotor iron core.

In an implementation of this application, on the rotor iron core, a positioning protrusion configured to fix the permanent magnet is provided on a side, of two ends of the magnetic steel groove, that is away from a rotating shaft of the rotor iron core. A demagnetizing field applied to the permanent magnet mainly acts on an outer edge region of the magnet. Therefore, a positioning protrusion structure is introduced into the outer edge region of the magnetic steel groove. This can reduce a requirement for a coercive force at both ends of the magnet, reduce a possibility of demagnetization of the permanent magnet in actual use, improve an overall anti-demagnetization capability of the motor, and ensure reliability of the motor, and can also further effectively reduce an amount of usage of heavy rare earth and save resources.

In an implementation of this application, a peripheral surface of the positioning protrusion is an arc-shaped curved surface. The arc-shaped curved surface can avoid concentration of stress at a corner location.

In an implementation of this application, a protrusion size of the positioning protrusion is less than or equal to ⅓ of a size of the permanent magnet in a protrusion direction of the positioning protrusion.

In some implementations of this application, a groove connected to the positioning protrusion is further provided on the rotor iron core, and the groove is located on a side, of the positioning protrusion, that is close to a middle part of the magnetic steel groove. The design of the groove facilitates assembly of the permanent magnet and prevents the permanent magnet from being damaged in an assembly process.

In an implementation of this application, a width size of an opening of the groove is less than or equal to ⅕ of a size of the permanent magnet in an extension direction of the opening of the groove.

In an implementation of this application, an arrangement manner of the plurality of permanent magnets is not limited, and the plurality of permanent magnets may be in any existing form, for example, may be specifically in a linear shape, a V shape, a double-V shape, a E shape, a U shape, or a double-U shape.

In some other implementations of this application, the plurality of permanent magnets are arranged on the rotor iron core in a surface-mounted manner, and the plurality of permanent magnets are attached to a peripheral surface of the rotor iron core.

A second aspect of embodiments of this application provides a motor, including a motor rotor and a stator. The motor rotor includes the motor rotor according to the first aspect of embodiments of this application. The stator is fixed around the motor rotor, and the stator includes a stator iron core and a stator winding. The motor may be a radial magnetic flux motor or an axial magnetic flux motor.

An embodiment of this application further provides a vehicle, including the motor according to the second aspect of embodiments of this application. The motor provides a driving force for the vehicle.

An embodiment of this application further provides an electric appliance, including the motor according to the second aspect of embodiments of this application. The motor provides a driving force for the electric appliance.

According to the motor rotor and the permanent magnet motor provided in embodiments of this application, the permanent magnet with the gradient coercive force design is used in the motor rotor. This can improve reliability of the motor while minimizing costs. In addition, an overall change trend of a coercive force from a center to both ends of the permanent magnet is smooth, without a sudden change. This can better increase a coercive force difference between the center and the ends of the permanent magnet, thereby better ensuring stability and reliability of the motor. This can also better avoid excessive anti-demagnetization performance, reduce an amount of usage of heavy rare earth, and achieve low costs. In addition, in embodiments of this application, the positioning protrusion is provided on the side, of the two ends of the magnetic steel groove, that is away from the rotating shaft of the rotor iron core. This can further reduce a requirement for a coercive force at both ends of the magnet, reduce a possibility of demagnetization of the permanent magnet in actual use, improve an overall anti-demagnetization capability of the motor, and ensure reliability of the motor, and can also further effectively reduce an amount of usage of heavy rare earth and reduce costs of the motor. The design of the groove can further reduce an anti-demagnetization requirement, and also facilitates assembly of the permanent magnet and prevents the permanent magnet from being damaged.

DESCRIPTION OF EMBODIMENTS

The following describes embodiments of this application with reference to the accompanying drawings in embodiments of this application.

Figure 1:
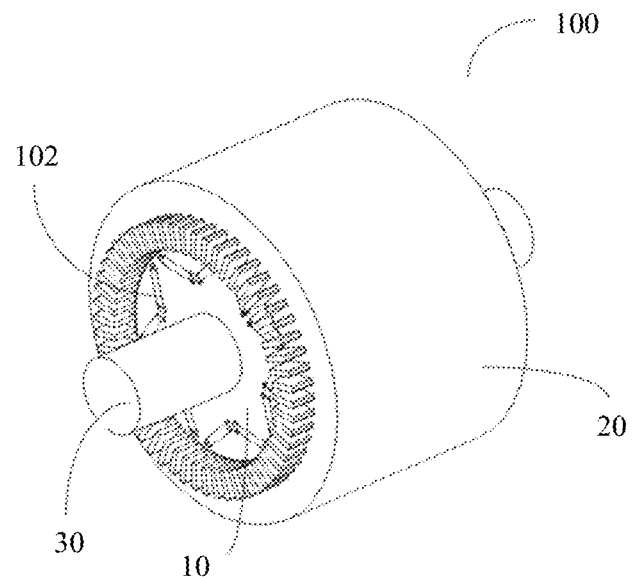
FIG. 1 is a schematic three-dimensional diagram of a structure of a motor according to an embodiment of this application.
Figure 2:
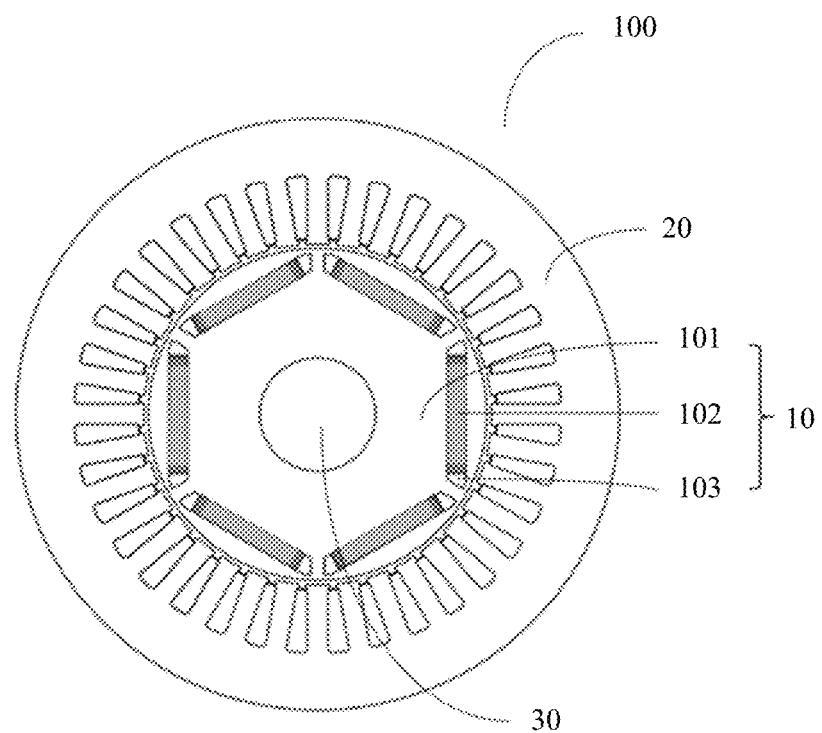
FIG. 2 is a schematic axial cross-sectional view of a structure of a motor according to an embodiment of this application.

As shown in FIG. 1 and FIG. 2, an embodiment of this application provides a motor 100, including a motor rotor 10 and a stator 20 fixed around the motor rotor 10. The motor rotor 10 penetrates a center location on the stator 20. A gap is reserved between the stator 20 and the motor rotor 10. A permanent magnet is disposed in the motor rotor 10 to form a permanent magnet motor. The stator 20 includes a stator iron core and a stator winding. The stator iron core may be formed by stacking a plurality of silicon steel sheets. The motor 100 may be a radial magnetic flux motor shown in FIG. 1 and FIG. 2, or may be an axial magnetic flux motor.

As shown in FIG. 1 and FIG. 2, in this embodiment of this application, the motor rotor 10 includes a rotor iron core 101 and a plurality of permanent magnets 102 disposed on the rotor iron core 101. A rotating shaft 30 penetrates a center location on the rotor iron core 101. A coercive force of each permanent magnet 102 is gradiently distributed in a multi-stage manner or continuously gradiently distributed along at least one direction perpendicular to a magnetization direction. In some implementations of this application, alternatively, coercive forces of only some of the plurality of permanent magnets 102 may be gradiently distributed or continuously gradiently distributed from the middle to both ends along at least one direction perpendicular to a magnetization direction. The permanent magnet 102 with the gradient coercive force design is used in the motor rotor 10. A coercive force of the permanent magnet 102 is continuously gradiently distributed or gradiently distributed in a multi-stage manner from the middle to both ends. In this way, a coercive force change of the entire permanent magnet is uniform, and stability and reliability of the motor can be maximized. In addition, this can avoid excessive anti-demagnetization performance, reduce an amount of usage of heavy rare earth elements, and minimize costs of the motor.

The coercive force is an indicator used to evaluate quality of the permanent magnet. A meaning of the coercive force is as follows: After a magnetic material undergoes saturation magnetization, when an external magnetic field returns to zero, magnetic induction strength B of the external magnetic field does not return to zero, and the magnetic induction strength can return to zero only when a magnetic field with a specific magnitude is applied in a direction opposite to the original magnetic field. This magnetic field is referred to as a coercive magnetic field, and is also referred to as the coercive force. For a neodymium iron boron permanent magnet, heavy rare earth elements such as Dy and Tb may be introduced into the magnet to enhance a coercive force. Higher content of heavy rare earth indicates a larger coercive force. In an implementation of this application, in the permanent magnet 102, along a direction in which the coercive force is gradient, a change trend of a concentration of a heavy rare earth metallic element corresponds to a change trend of the coercive force. The concentration of the heavy rare earth metallic element in the permanent magnet 102 is continuously gradiently distributed or gradiently distributed in a multi-stage manner from the middle to both ends along the direction in which the coercive force is gradient. In an implementation of this application, the multi-stage in the multi-stage gradient may be two or more stages.

In some implementations of this application, a change trend of the coercive force of the permanent magnet 102 from the middle to both ends along the at least one direction perpendicular to the magnetization direction is as follows: continuously gradiently increasing or gradiently increasing in a multi-stage manner. In most cases, an anti-demagnetization requirement at both ends of the permanent magnet is higher than an anti-demagnetization requirement in a middle part. The coercive force is designed to gradually increase from the middle to both ends, so that the permanent magnet can have both a high anti-demagnetization region at the ends for ensuring reliability of the motor and a low anti-demagnetization region with low content of heavy rare earth elements in the middle part for reducing costs. In some other implementations, the coercive force may be alternatively designed to gradually decrease from the middle to both ends according to an actual requirement. In an implementation of this application, to ensure specific anti-demagnetization performance at any location on the permanent magnet, the coercive force is greater than 0 at any location along the direction in which the coercive force is gradient.

Figure 3:
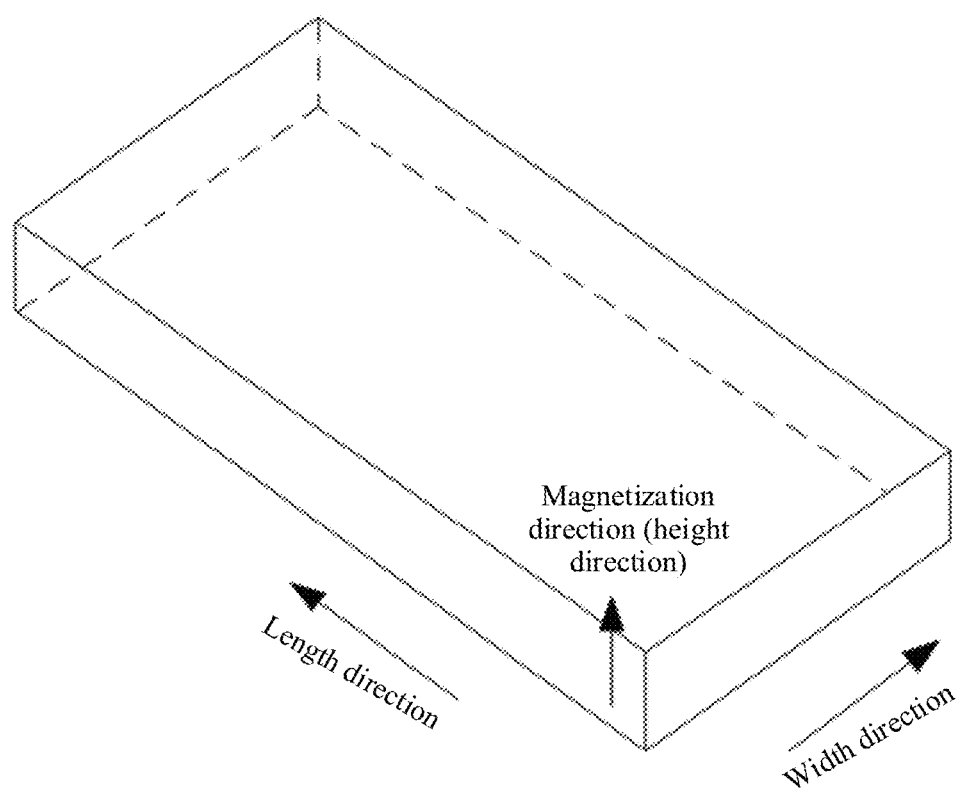
FIG. 3 is a schematic diagram of a structure of a permanent magnet with a cuboid structure according to an implementation of this application.

In an implementation of this application, a specific shape of the permanent magnet 102 is not limited, and the permanent magnet 102 may be designed into different shapes according to an actual application requirement. For a radial magnetic flux motor, an axial cross-sectional shape of the permanent magnet 102 in a direction perpendicular to a rotating shaft of the rotor iron core may be a rectangular shape, a tile shape, a bread shape, a crescent shape, or the like. For an axial magnetic flux motor, a cylindrical cross-sectional shape of the permanent magnet 102 in a radial direction may be a rectangular shape, a tile shape, a bread shape, a crescent shape, or the like. In some implementations of this application, the permanent magnet 102 may be in a cuboid structure shown in FIG. 3. As shown in FIG. 2, for the cuboid permanent magnet, when the permanent magnet 102 is configured in a magnetic steel groove 103 on the rotor iron core 101, a length direction of the cuboid permanent magnet is the same as an axial direction of the rotor iron core, and a width direction is an extension direction of the permanent magnet on an axial end face (an end face perpendicular to a rotating shaft 30 of the rotor iron core, that is, an axial cross section) of the rotor iron core, that is, a width direction of the magnetic steel groove. A magnetization direction of the cuboid permanent magnet is usually a height direction, namely, a thickness direction. Therefore, a direction perpendicular to the magnetization direction may be the length direction or the width direction. To be specific, a coercive force of the cuboid permanent magnet 102 meets the foregoing gradient design along the length direction, or the coercive force meets the foregoing gradient design along the width direction, or the coercive force meets the foregoing gradient design along both the length direction and the width direction.

In an implementation of this application, the permanent magnet 102 may be a sintered neodymium iron boron magnet.

In some implementations of this application, the permanent magnet 102 is an integrally molded permanent magnet, in other words, is in a continuous integrated structure. The concentration of the heavy rare earth metallic element in the permanent magnet is continuously gradiently distributed or gradiently distributed in a multi-stage manner from a center to both ends along the direction in which the coercive force is gradient, so that the coercive force is continuously gradiently distributed or gradiently distributed in a multi-stage manner from the center to both ends. In this implementation, the permanent magnet 102 with the gradient coercive force design is formed by using a permanent magnet with an integrated structure and a heavy rare earth grain boundary diffusion technology, and is specifically formed by diffusing heavy rare earth metallic elements with different concentrations at different locations on the permanent magnet with the integrated structure along at least one direction perpendicular to a magnetization direction. The heavy rare earth metallic elements may include dysprosium (Dy), terbium (Tb), and other elements. In an implementation of this application, the permanent magnet 102 may be formed by diffusing heavy rare earth metallic elements with different concentrations on different sections of a permanent magnet of a specific brand, and may be specifically formed through element diffusion by applying coatings that contain heavy rare earth elements and that have different concentrations or thicknesses to surfaces at different locations on a permanent magnet of a specific brand. In this implementation, the permanent magnet 102 is obtained through integral molding, and does not need to be fixed through bonding by using a bonding agent. This can be implemented by using an existing diffusion device, without adding a process, thereby achieving high efficiency and high material utilization, and facilitating mass production. In addition, the integrally molded permanent magnet has a stable structure and higher mechanical reliability, thereby avoiding a failure of the permanent magnet caused by aging and peeling of glue. In this implementation, the coercive force can be well continuously gradiently distributed from the center to both ends, so that the coercive force of the permanent magnet can be distributed more uniformly and change more smoothly, thereby better ensuring stability and reliability of the motor. In addition, this can more accurately reduce redundancy of a coercive force design of the permanent magnet, reduce an amount of usage of heavy rare earth, and reduce costs of the permanent magnet.

In some other implementations of this application, the permanent magnet 102 is formed by splicing a plurality of sections of magnets with different coercive forces. Specifically, the permanent magnet 102 is formed by bonding the plurality of sections of magnets with different coercive forces by using a bonding agent, or by welding the plurality of magnets. In this implementation, to reduce preparation difficulty, a coercive force of each section of magnet is usually distributed uniformly, that is, coercive forces at any locations are the same. Therefore, a coercive force of the permanent magnet 102 formed by splicing the plurality of sections of magnets is gradiently distributed in a multi-stage manner from the middle to both ends. Certainly, in some implementations, a coercive force of each section of magnet may be alternatively gradiently distributed, so that a coercive force of the permanent magnet 102 formed through splicing changes continuously or changes with a small gradient.

Figure 4:
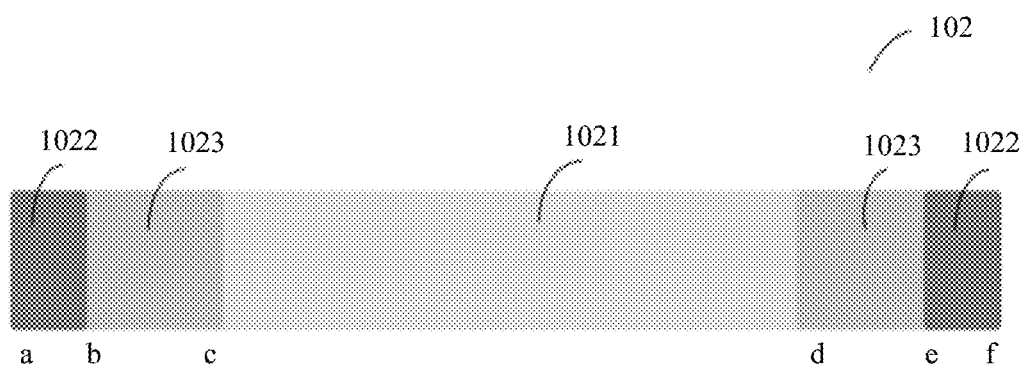
FIG. 4 is a schematic diagram of a structure of the permanent magnet in FIG. 2.

As shown in FIG. 4, in some implementations of this application, along a width direction perpendicular to the magnetization direction, the permanent magnet 102 may include a center section 1021 and end sections 1022 located at both ends of the center section 1021. At least one transition section 1023 is included between the center section 1021 and the end section 1022. The coercive force of the permanent magnet 102 is gradiently distributed in a multi-stage manner or continuously gradiently distributed from the center section 1021 to the end sections 1022 at both ends. In an implementation of this application, a width of each section may be more than 1 mm.

Usually, in the motor rotor 10, both ends of the permanent magnet 102 require a higher anti-demagnetization capability, and a center part requires a lower anti-demagnetization capability. The following provides detailed descriptions by using an example in which the coercive force of the permanent magnet 102 continuously gradiently increases or gradiently increases in a multi-stage manner from the middle to both ends along the width direction.

In this embodiment of this application, the permanent magnet 102 with the gradient coercive force design is used in the motor rotor 10. The end section 1022 has a larger coercive force, and therefore has high anti-demagnetization performance, so that reliability of the motor can be ensured. The center section 1021 has a smaller coercive force, and therefore has low content of heavy rare earth elements, so that an amount of usage of rare earth can be reduced, and costs can be reduced. In addition, the transition section 1023 is provided, so that the coercive force of the permanent magnet is distributed more uniformly, and a coercive force change from the center to both ends is smoother. In addition, a coercive force difference between the center section 1021 and the end section 1022 can be better increased, thereby better ensuring stability and reliability of the motor, avoiding excessive anti-demagnetization performance, reducing an amount of usage of rare earth, and achieving low costs.

In an implementation of this application, along the direction in which the coercive force is gradient, that is, the width direction, a proportion of a width of the center section 1021 to a total width of the permanent magnet 102 is greater than 30%. Specifically, the proportion of the width of the center section may be 35% to 50%. In some implementations of this application, a proportion of a width of the center section 1021 to a total width of the permanent magnet 102 is greater than 50%. Specifically, the proportion of the width of the center section may be 55% to 65%. The center section 1021 has a small coercive force, and therefore has a low concentration of heavy rare earth elements. The center section is controlled to reach a specific width ratio, thereby helping reduce an amount of usage of heavy rare earth elements in the entire permanent magnet.

In an implementation of this application, along the direction in which the coercive force is gradient, a width of the end section 1022 (each end section) is less than 10% of the total width of the permanent magnet 102. In some implementations of this application, a width of the end section 1022 is 5% to 9% of the total width of the permanent magnet 102. The end section 1022 has the largest coercive force, and therefore has the highest concentration of heavy rare earth elements. The end section is controlled to have a small width, thereby helping reduce a proportion of the end section with the highest concentration of heavy rare earth elements, and reduce an amount of usage of heavy rare earth elements.

In an implementation of this application, a minimum coercive force of the end section 1022 is more than 30% greater than a minimum coercive force of the center section 1021. In some implementations of this application, a minimum coercive force of the end section 1022 may be more than 50% greater than a minimum coercive force of the center section 1021. The end section requires a higher anti-demagnetization capability, and the center section requires a lower anti-demagnetization capability. The coercive force of the end section is designed to be at a higher level, so that an anti-demagnetization capability of the end section of the permanent magnet can be improved, and reliability of the motor can be removed. The coercive force of the center section is designed to be at a lower level, so that an amount of usage of rare earth can be reduced, and costs of the motor can be reduced.

In an implementation of this application, when the coercive force of the end section is continuously gradiently distributed, a difference between a maximum coercive force and the minimum coercive force of the end section is from 5% to 30%, and may be specifically 10% to 25% or 15% to 20%.

In an implementation of this application, a difference between minimum coercive forces of the end section 1022 and an adjacent transition section is greater than 12%. In an implementation of this application, a difference between minimum coercive forces of the center section 1021 and an adjacent transition section is from 3% to 10%.

In an implementation of this application, a coercive force gradient degree at both ends of the permanent magnet is greater than a coercive force gradient degree in the middle part. Specifically, in some implementations, a coercive force gradient degree gradually increases from the middle to both ends. Coercive forces of adjacent sections at two opposite ends, that is, on an outermost side, of the permanent magnet are designed to change faster. This can more fully meet a higher anti-demagnetization requirement at the ends of the permanent magnet of the motor, and improve reliability of the motor. Coercive forces of adjacent sections in the middle part, that is, on an inner side, of the permanent magnet are designed to change more slowly. This can meet an actual anti-demagnetization requirement while reducing redundancy of a coercive force of the permanent magnet and more effectively reducing an amount of usage of heavy rare earth elements.

In an implementation of this application, a coercive force of the permanent magnet from the center to both ends along a width direction may be symmetrically distributed or asymmetrically distributed.

In an implementation of this application, a magnetic remanence of two adjacent sections of the permanent magnet is the same or basically the same. In some implementations, a magnetic remanence difference between two adjacent sections of the permanent magnet 102 is less than or equal to 3%. In some other implementations, a magnetic remanence difference between two adjacent sections of the permanent magnet 102 is less than or equal to 2%. In some other implementations, a magnetic remanence difference between two adjacent sections of the permanent magnet is less than or equal to 1%. Magnetic remanence, namely, residual magnetic induction strength, is a surface field retained by magnetizing the permanent magnet to saturation and removing an external magnetic field, and is denoted as Br.

In an implementation of this application, one or more transition sections 1023 may be provided between the center section 1021 and the end section 1022. When a plurality of transition sections are provided, a coercive force change from the center section to the end section is smoother, thereby helping improve overall performance of the permanent magnet.

In an implementation of this application, as shown in FIG. 2 and FIG. 4, one transition section 1023 is included between the center section 1021 and the end section 1022, and the permanent magnet 102 is in a five-section structure, including an ab section, a bc section, a cd section, a de section, and an ef section. The permanent magnets 102 are distributed on the rotor iron core 101 at spacings in a linear shape.

Figure 5:
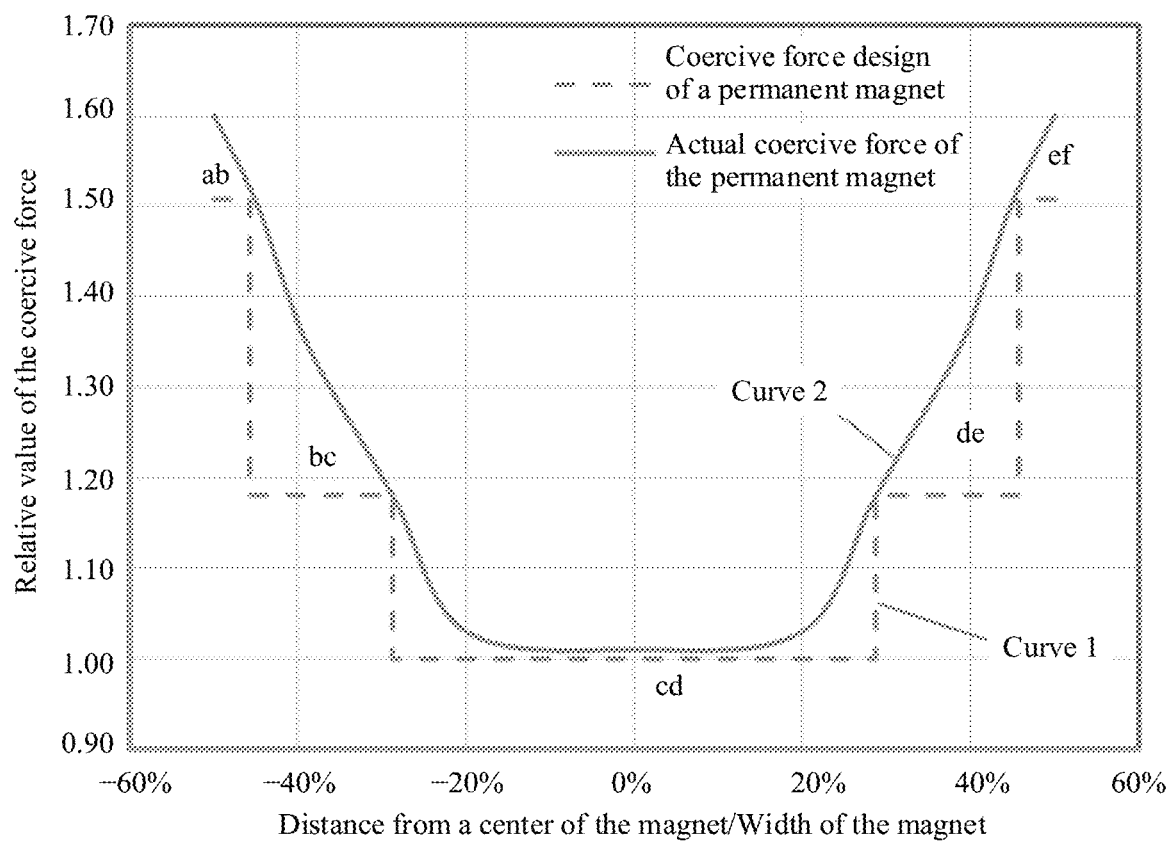
FIG. 5 is a schematic diagram of a coercive force design and actual coercive force distribution of the permanent magnet in FIG. 4.

In some implementations of this application, the permanent magnet 102 is formed by splicing, along a specific direction, five sections of magnets with different coercive forces, namely, the ab section, the bc section, the cd section, the de section, and the ef section, to form gradient distribution of coercive forces in the direction. A coercive force of the ab section is greater than a coercive force of the bc section, and the coercive force of the bc section is greater than a coercive force of the cd section. A coercive force of the ef section is greater than a coercive force of the de section, and the coercive force of the de section is greater than the coercive force of the cd section. That is, the coercive force of the permanent magnet 102 is distributed in a manner of gradiently increasing from the center to both ends. A curve 1 in FIG. 5 is a coercive force design curve of the permanent magnet 102 with the five-section structure in an implementation of this application. For the permanent magnet 102 formed through splicing, a coercive force of each section of magnet is usually a single value, and the coercive force of the entire permanent magnet 102 is distributed in a manner of gradiently increasing from the center to both ends. Therefore, a curve of actual coercive force distribution, along the width direction, of the permanent magnet 102 produced and prepared based on the curve 1 is basically the same as the coercive force design curve 1. Certainly, in some embodiments, an actual coercive force of each section may be alternatively slightly greater than a designed coercive force value in the curve 1. In an implementation of this application, the coercive force of the permanent magnet 102 may be symmetrically distributed, to be specific, coercive forces of the ab section and the ef section are the same, and coercive forces of the bc section and the de section are the same; or the coercive force of the permanent magnet 102 may be designed, according to anti-demagnetization performance requirements of the motor for different locations on the permanent magnet 102, to be asymmetrically distributed, to be specific, coercive forces of the ab section and the ef section are different, and/or coercive forces of the bc section and the de section are different. In addition, widths of sections located on two sides of the center section may also be symmetrical, to be specific, widths of the ab section and the ef section are the same, and widths of the bc section and the de section are the same; or widths of sections located on two sides of the center section may be asymmetrical.

In some other implementations of this application, the permanent magnet 102 is in an integrally molded structure, to be specific, the ab section, the bc section, the cd section, the de section, and the ef section constitute a continuous integrated structure, and organizational structures of all sections of the permanent magnet 102 are continuous. The coercive force of the permanent magnet 102 is distributed in a manner of continuously gradiently increasing from the center to both ends by diffusing heavy rare earth metallic elements with different concentrations on different sections along the width direction. A coercive force of the ab section is greater than a coercive force of the bc section, and the coercive force of the bc section is greater than a coercive force of the cd section. A coercive force of the ef section is greater than a coercive force of the de section, and the coercive force of the de section is greater than the coercive force of the cd section. A curve 2 in FIG. 5 is a curve of actual coercive force distribution, along the width direction, of the permanent magnet 102 prepared according to a coercive force customization requirement of the curve 1 in an implementation of this application. It can be learned from the curve 2 that the coercive force of the permanent magnet 102 is distributed in a manner of continuously gradiently increasing from the center to both ends along the width direction, and coercive forces of adjacent sections of magnets along the width direction change continuously without obvious gradient boundaries. An actual coercive force value of each section of magnet reaches a designed coercive force value of the corresponding section in the curve 1. For the permanent magnet produced according to the customization requirement of the curve 1, an actual coercive force value of each section of magnet needs to reach a designed coercive force value of the corresponding section, that is, a designed coercive force value of the curve 1 is a limitation on a minimum coercive force of an actual product. To be specific, a coercive force value at any location needs to reach a designed coercive force value, or may be greater than the designed value. In an implementation of this application, the coercive force of the permanent magnet 102 may be symmetrically distributed, as shown in FIG. 5, to be specific, coercive forces of the ab section and the ef section are the same, and coercive forces of the bc section and the de section are the same; or the coercive force of the permanent magnet 102 may be designed, according to anti-demagnetization performance requirements of the motor for different locations on the permanent magnet 102, to be asymmetrically distributed, to be specific, coercive forces of the ab section and the ef section are different, and/or coercive forces of the bc section and the de section are different. In addition, widths of sections located on two sides of the center section may also be symmetrical, to be specific, widths of the ab section and the ef section are the same, and widths of the bc section and the de section are the same; or widths of sections located on two sides of the center section may be asymmetrical.

Figure 6:
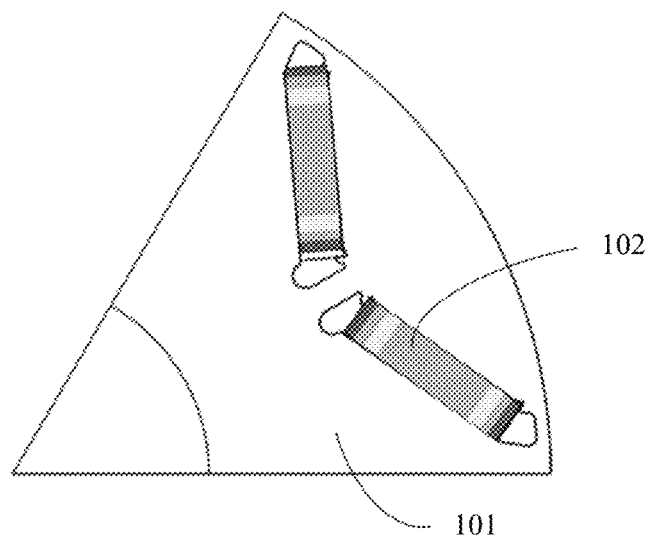
FIG. 6 is a schematic diagram of a structure of a motor rotor according to an embodiment of this application.
Figure 7:
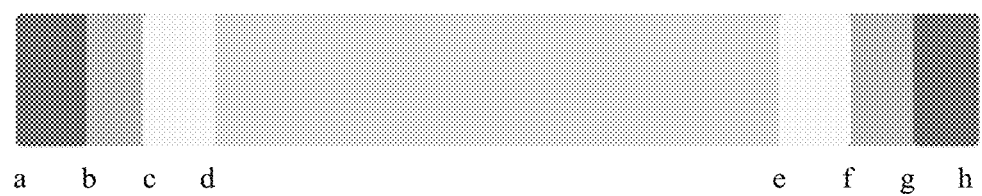
FIG. 7 is a schematic diagram of a structure of the permanent magnet in FIG. 6.
Figure 8:
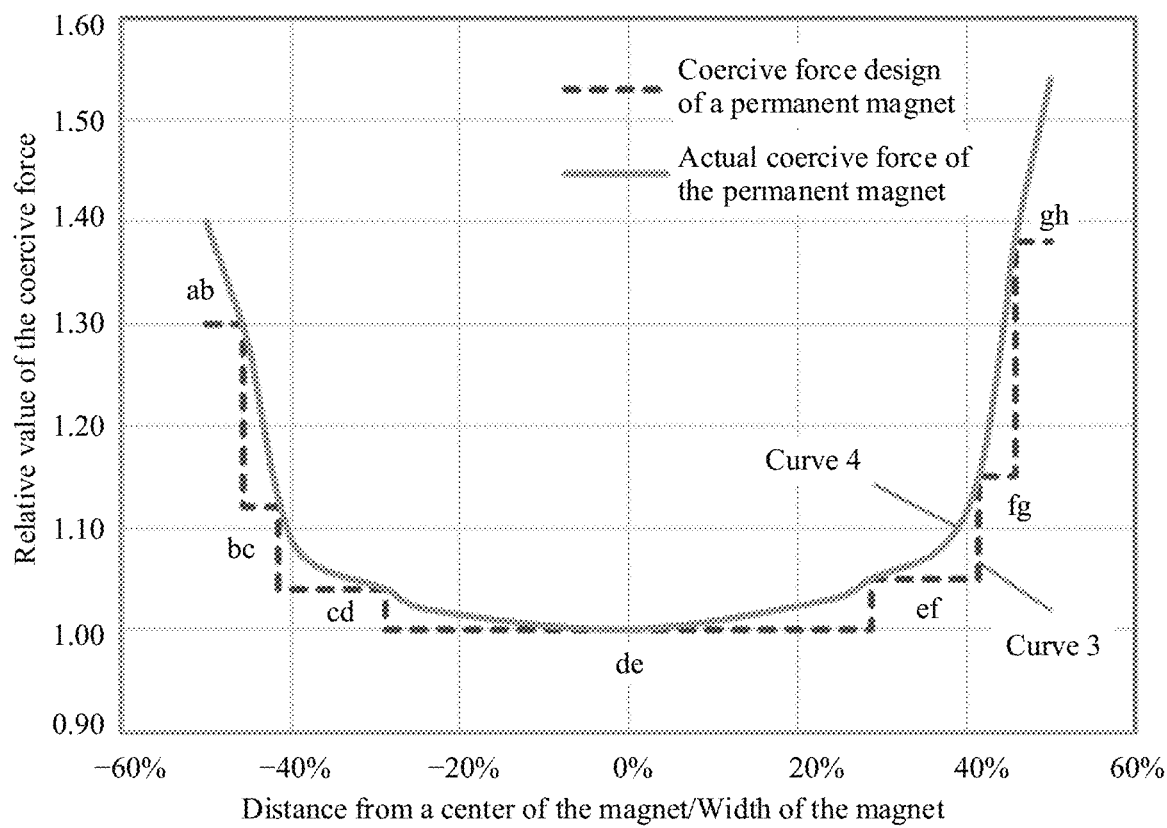
FIG. 8 is a schematic diagram of a coercive force design and actual coercive force distribution of the permanent magnet in FIG. 7.

In another implementation of this application, as shown in FIG. 6 and FIG. 7, two transition sections are included between the center section 1021 and the end section 1022, and the permanent magnet 102 is in a seven-section structure, including an ab section, a bc section, a cd section, a de section, an ef section, an fg section, and a gh section. The permanent magnets 102 are distributed on the rotor iron core at spacings in a V shape. A curve 3 in FIG. 8 is a coercive force design curve of the permanent magnet 102 with the seven-section structure in an implementation of this application. Similar to the five-section structure, in the seven-section magnet in this embodiment of this application, if the permanent magnet 102 is formed through splicing, a curve of actual coercive force distribution, along the width direction, of the permanent magnet 102 produced and prepared based on the curve 3 is basically the same as the coercive force design curve 3. In another implementation of this application, the permanent magnet 102 is in an integrally molded structure, to be specific, the ab section, the bc section, the cd section, the de section, the ef section, the fg section, and the gh section constitute a continuous integrated structure, and organizational structures of all sections of the permanent magnet 102 are continuous. The coercive force of the permanent magnet 102 is distributed in a manner of continuously gradiently increasing from the center to both ends by diffusing heavy rare earth metallic elements with different concentrations on different sections along the width direction. A coercive force of the ab section is greater than a coercive force of the bc section, the coercive force of the bc section is greater than a coercive force of the cd section, and the coercive force of the cd section is greater than a coercive force of the de section. A coercive force of the gh section is greater than a coercive force of the fg section, the coercive force of the fg section is greater than a coercive force of the ef section, and the coercive force of the ef section is greater than the coercive force of the de section. A curve 4 in FIG. 8 is a curve of actual coercive force distribution, along the width direction, of the permanent magnet 102 prepared according to a coercive force customization requirement of the curve 3 in an implementation of this application. It can be learned from the curve 4 that the coercive force of the permanent magnet 102 is distributed in a manner of continuously gradiently increasing from the center to both ends along the width direction, and coercive forces of adjacent sections of magnets along the width direction change continuously without obvious gradient boundaries. An actual coercive force value of each section of magnet reaches a designed coercive force value of the corresponding section in the curve 3. In some implementations of this application, the coercive force of the permanent magnet 102 may be asymmetrically distributed, as shown in FIG. 8, to be specific, coercive forces of the ab section and the gh section are different, and/or coercive forces of the bc section and the fg section are different, and/or coercive forces of the cd section and the ef section are different. In some other implementations of this application, alternatively, the coercive force of the permanent magnet 102 may be designed, according to anti-demagnetization performance requirements of the motor for different locations on the permanent magnet 102, to be symmetrically distributed, to be specific, coercive forces of the ab section and the gh section are the same, coercive forces of the bc section and the fg section are the same, and coercive forces of the cd section and the ef section are the same. In addition, widths of sections located on two sides of the center section may also be symmetrical, to be specific, widths of the ab section and the gh section are the same, widths of the bc section and the fg section are the same, and widths of the cd section and the ef section are the same; or widths of sections located on two sides of the center section may be asymmetrical.

In addition, in an implementation of this application, coercive forces of adjacent sections at two opposite ends of the permanent magnet 102 change fast, and coercive forces of adjacent sections in the middle part change slowly. For example, for a coercive force change from the ab section to the cd section, a coercive force changes fast with a large gradient from the ab section to the bc section, and a coercive force changes slowly with a small gradient from the bc section to the cd section. For another example, for a coercive force change from the ab section to the de section, a coercive force changes fast with a large gradient from the ab section to the bc section, and a coercive force changes slowly with a small gradient from the bc section to the cd section and from the cd section to the de section.

In another implementation of this application, three transition sections may be included between the center section 1021 and the end section 1022, and the permanent magnet 102 is in a nine-section structure. In some other implementations, more transition sections may be included between the center section 1021 and the end section 1022.

In an implementation of this application, the plurality of permanent magnets may be arranged on the rotor iron core in a built-in manner or a surface-mounted manner.

In some implementations of this application, the plurality of permanent magnets are arranged on the rotor iron core in a built-in manner. As shown in FIG. 2 and FIG. 6, a plurality of magnetic steel grooves 103 are provided on the rotor iron core, and the plurality of magnetic steel grooves 103 are provided on an axial end face of the rotor iron core at intervals along a circumferential direction of the rotor iron core. The plurality of permanent magnets are disposed in the plurality of magnetic steel grooves in a one-to-one correspondence.

Figure 9:
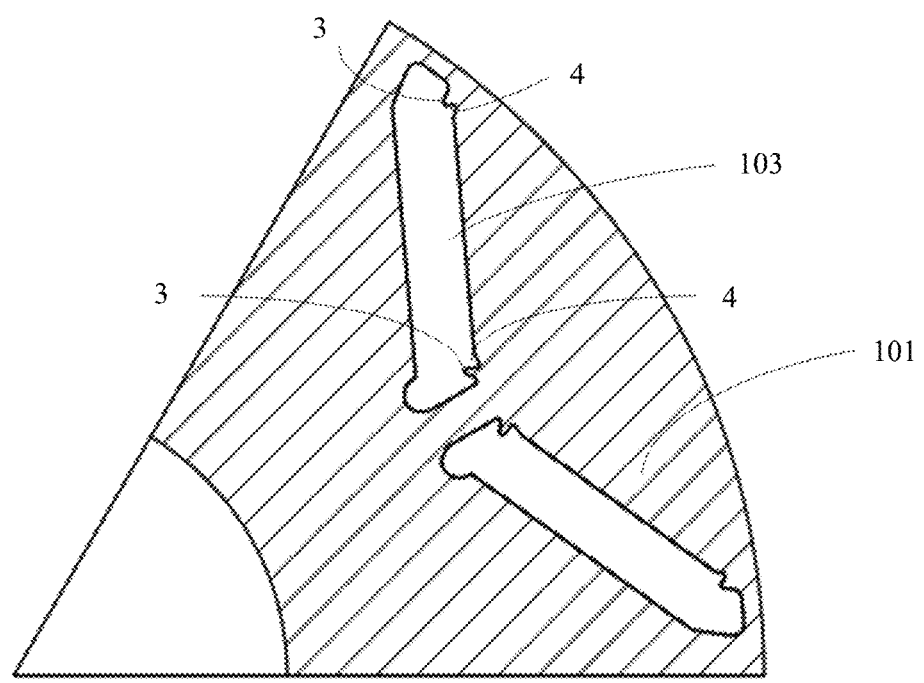
FIG. 9 is a schematic diagram of arrangement of a positioning protrusion and a groove according to an embodiment of this application.

As shown in FIG. 9, in an implementation of this application, on the rotor iron core 101, a positioning protrusion 3 configured to fix the permanent magnet is provided on a side, of two ends of the magnetic steel groove 103, that is away from a rotating shaft of the rotor iron core 101. A shape of the positioning protrusion 3 is not limited, provided that the positioning protrusion can abut against or clamp the permanent magnet to fix the permanent magnet. A demagnetizing field applied to the permanent magnet mainly acts on an outer edge region of the magnet. Therefore, a positioning protrusion structure is introduced into the outer edge region of the magnetic steel groove. This can reduce a requirement for a coercive force at both ends of the magnet, reduce a possibility of demagnetization of the permanent magnet in actual use, improve an overall anti-demagnetization capability of the motor, and ensure reliability of the motor, and can also further effectively reduce an amount of usage of heavy rare earth and save resources.

In an implementation of this application, a shape of the positioning protrusion 3 may be specifically various different shapes. In some implementations of this application, a peripheral surface of the positioning protrusion 3 is in a shape of a smooth curved surface, and may be specifically in a shape of an arc-shaped curved surface. The arc-shaped curved surface can avoid concentration of stress at a corner location, thereby reducing local stress, extending service life of the rotor, and improving operating reliability of the motor. A cross-sectional shape of the positioning protrusion 3 on the axial end face of the rotor iron core may be an arc-shaped section, for example, is specifically a semi-elliptic shape.

In an implementation of this application, a protrusion size of the positioning protrusion 3 is less than or equal to ⅓ of a size of the permanent magnet in a protrusion direction of the positioning protrusion 3. Specifically, the protrusion size of the positioning protrusion 3 may be 1/10 to ¼ or ⅛ to ⅙ of the size of the permanent magnet in the protrusion direction of the positioning protrusion 3. The protrusion direction is usually a height direction of the permanent magnet. For a permanent magnet with a non-uniform size in the protrusion direction, a size of the permanent magnet in the protrusion direction of the positioning protrusion 3 is usually a maximum size in the direction. A suitable size of the positioning protrusion can ensure good fixation of the permanent magnet, and can also well avoid concentration of stress.

In some implementations of this application, a groove 4 connected to the positioning protrusion 3 is further provided on the rotor iron core 101, and the groove 4 is located on a side, of the positioning protrusion 3, that is close to a middle part of the magnetic steel groove 103. With the arrangement of the groove 4, an anti-demagnetization requirement at the ends of the permanent magnet can be further reduced, and an amount of usage of heavy rare earth elements is reduced. In addition, this facilitates assembly of the permanent magnet, and can prevent the permanent magnet from being damaged during assembly or operating due to a processing error of the rotor iron core and the permanent magnet, thereby extending service life of the motor rotor. An inner concave surface of the groove 4 may also be in a shape of an arc-shaped curved surface.

In an implementation of this application, a width size of an opening of the groove 4 may be less than or equal to ⅕ of a size of the permanent magnet in an extension direction of the opening of the groove 4. Specifically, the width size of the opening of the groove 4 is 1/10 to ⅙ or 1/9 to 1/7 of the size of the permanent magnet in the extension direction of the opening of the groove 4. The extension direction of the opening of the groove 4 is usually a width direction of the permanent magnet. For a permanent magnet with a non-uniform size in the extension direction of the opening, a size of the permanent magnet in the extension direction of the opening of the groove 4 is usually a maximum size in the direction. A suitable size of the groove can ensure smooth assembly, can prevent unstable assembly of the permanent magnet caused by an excessively large gap, and can also prevent impact on an electromagnetic function caused by an excessively large size of the groove.

In an implementation of this application, an arrangement manner of the plurality of permanent magnets 102 on the rotor iron core 101 is not limited. The plurality of permanent magnets 102 may be in any existing form, for example, may be in the linear shape shown in FIG. 2 or the V shape shown in FIG. 1 and FIG. 6, or may be in a double-V shape, a ▨ shape, a U shape, a double-U shape, or the like, and may be specifically arranged according to an actual design requirement of the motor.

In some implementations of this application, the plurality of permanent magnets 102 are arranged on the rotor iron core 101 in a surface-mounted manner, and the plurality of permanent magnets 102 are attached to a peripheral surface of the rotor iron core 101. The plurality of permanent magnets 102 are distributed at intervals along a circumferential direction of the rotor iron core 101.

An embodiment of this application further provides a vehicle. The foregoing motor in embodiments of this application is used in the vehicle. The motor provides a driving force for the vehicle. A specific type of the vehicle is not limited.

An embodiment of this application further provides an electric appliance. The foregoing motor in embodiments of this application is used in the electric appliance. The motor provides a driving force for the electric appliance. A specific category of the electric appliance is not limited, and the electric appliance may be various household appliances, industrial appliances, or the like.

What is claimed is:

1. A motor rotor, comprising:
   a rotor iron core; and
   a plurality of permanent magnets disposed on the rotor iron core, wherein at least some permanent magnets of the plurality of permanent magnets comprise concentrations of rare earth metallic elements continuously gradiently distributed or gradiently distributed in a multi-stage manner from a middle to both ends in a first trend along at least one direction perpendicular to a magnetization direction;
   wherein the concentrations of rare earth metallic elements result in coercive forces of the at least some permanent magnets of the plurality of permanent magnets in a second trend along the at least one direction perpendicular to the magnetization direction, wherein the second trend proportionally corresponds to the first trend; and
   wherein the concentrations of rare earth metallic elements result in magnetic forces of the at least some permanent magnets of the plurality of permanent magnets in a third trend along the at least one direction perpendicular to the magnetization direction, wherein the third trend proportionally corresponds to the first trend.

2. The motor rotor according to claim 1, wherein the second trend of the coercive forces of the at least some permanent magnets of the plurality of permanent magnets from the middle to both ends along the at least one direction perpendicular to the magnetization direction is as follows: continuously gradiently increasing or gradiently increasing in a multi-stage manner.

3. The motor rotor according to claim 1, wherein the at least some permanent magnets of the plurality of permanent magnets are in an integrally molded structure.

4. The motor rotor according to claim 1, wherein the at least some permanent magnets of the plurality of permanent magnets are formed by splicing a plurality of sections of magnets with different coercive forces.

5. The motor rotor according to claim 1, wherein a coercive force gradient degree at both ends of a permanent magnet of the plurality of permanent magnets is greater than a coercive force gradient degree in a middle part.

6. The motor rotor according to claim 1, wherein along the direction perpendicular to the magnetization direction, the at least some permanent magnets of the plurality of permanent magnets comprise a center section and end sections located at both ends of the center section, and at least one transition section is further comprised between the center section and the end section.

7. The motor rotor according to claim 6, wherein along the direction perpendicular to the magnetization direction, a width of the center section is more than 30% of a total width of the at least some permanent magnets of the plurality of permanent magnets.

8. The motor rotor according to claim 6, wherein along the direction perpendicular to the magnetization direction, a width of the end section is less than 10% of the total width of the at least some permanent magnets of the plurality of permanent magnets.

9. The motor rotor according to claim 6, wherein a minimum coercive force of the end section is more than 30% greater than a minimum coercive force of the center section.

10. The motor rotor according to claim 6, wherein when the coercive force of the end section is continuously gradiently distributed, a difference between a maximum coercive force and the minimum coercive force of the end section is from 5% to 30%.

11. The motor rotor according to claim 6, wherein one transition section is comprised between the center section and the end section, and the at least some permanent magnets of the plurality of permanent magnets are in a five-section structure.

12. The motor rotor according to claim 1, wherein along the direction perpendicular to the magnetization direction, the coercive forces of the at least some permanent magnets of the plurality of permanent magnets from the middle to both ends is symmetrically distributed or asymmetrically distributed.

13. The motor rotor according to claim 1, wherein a plurality of magnetic steel grooves are provided on the rotor iron core, and the plurality of permanent magnets are disposed in the plurality of magnetic steel grooves in a one-to-one correspondence.

14. The motor rotor according to claim 13, wherein on the rotor iron core, a positioning protrusion configured to fix the plurality of permanent magnets is provided on a side, of two ends of the magnetic steel groove, that is away from a rotating shaft of the rotor iron core.

15. The motor rotor according to claim 14, wherein a peripheral surface of the positioning protrusion is an arc-shaped curved surface.

16. The motor rotor according to claim 14, wherein a groove connected to the positioning protrusion is further provided on the rotor iron core, and the groove is located on a side, of the positioning protrusion, that is close to a middle part of the magnetic steel groove.

17. The motor rotor according to claim 1, wherein the plurality of permanent magnets are sintered neodymium iron boron magnets.

18. The motor rotor according to claim 1, wherein the plurality of permanent magnets are attached to a peripheral surface of the rotor iron core.

19. A motor, comprising:
a stator; and
a motor rotor, comprising:
    a rotor iron core; and
    a plurality of permanent magnets disposed on the rotor iron core, wherein at least some permanent magnets of the plurality of permanent magnets comprise concentrations of rare earth metallic elements continuously gradiently distributed or gradiently distributed in a multi-stage manner from a middle to both ends in a first trend along at least one direction perpendicular to a magnetization direction;
wherein the concentrations of rare earth metallic elements result in coercive forces of the at least some permanent magnets of the plurality of permanent magnets in a second trend along the at least one direction perpendicular to the magnetization direction, wherein the second trend proportionally corresponds to the first trend; and
wherein the concentrations of rare earth metallic elements result in magnetic forces of the at least some permanent magnets of the plurality of permanent magnets in a third trend along the at least one direction perpendicular to the magnetization direction, wherein the third trend proportionally corresponds to the first trend.

20. The motor according to claim 19, wherein the second trend of the coercive forces of the at least some permanent magnets of the plurality of permanent magnets from the middle to both ends along the at least one direction perpendicular to the magnetization direction is as follows: continuously gradiently increasing or gradiently increasing in a multi-stage manner.

* * * * *